(12) United States Patent
Koma

(10) Patent No.: US 7,806,542 B2
(45) Date of Patent: Oct. 5, 2010

(54) DISPLAY DEVICE

(75) Inventor: Norio Koma, Motosu-gun (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 219 days.

(21) Appl. No.: 12/023,077

(22) Filed: Jan. 31, 2008

(65) Prior Publication Data

US 2008/0186722 A1 Aug. 7, 2008

(30) Foreign Application Priority Data

Feb. 1, 2007 (JP) .............................. 2007-023198
Oct. 29, 2007 (JP) .............................. 2007-280614

(51) Int. Cl.
*F21V 9/16* (2006.01)

(52) U.S. Cl. ........................... 362/84; 362/29; 362/482; 362/489

(58) Field of Classification Search ............. 362/23–25, 362/28, 30, 84, 88, 482, 489
See application file for complete search history.

(56) References Cited

U.S. PATENT DOCUMENTS

| | | | | |
|---|---|---|---|---|
| 3,027,668 | A | * | 4/1962 | Hardesty ....................... 40/544 |
| 4,181,925 | A | * | 1/1980 | Burrows et al. ............... 362/29 |
| 5,702,171 | A | * | 12/1997 | Lenzi ........................... 362/29 |
| 5,796,509 | A | * | 8/1998 | Doany et al. ................. 359/254 |
| 6,152,066 | A | * | 11/2000 | Knoll et al. .................. 116/288 |
| 6,802,276 | B2 | | 10/2004 | Sugimoto |
| 7,126,275 | B2 | * | 10/2006 | Tsuchiya ..................... 313/516 |
| 7,429,753 | B2 | * | 9/2008 | Tanase et al. ................. 257/72 |
| 2004/0141106 | A1 | * | 7/2004 | Wu et al. ....................... 349/69 |
| 2006/0132671 | A1 | | 6/2006 | Koma |
| 2006/0261337 | A1 | | 11/2006 | Koma |
| 2006/0262242 | A1 | | 11/2006 | Koma |

FOREIGN PATENT DOCUMENTS

| | | | |
|---|---|---|---|
| JP | 2001125509 A | * | 5/2001 |
| JP | 2002-132187 | | 5/2002 |
| JP | 2002-257602 | | 9/2002 |
| JP | 2003-4494 | | 1/2003 |
| JP | 2005345935 A | * | 12/2005 |
| JP | 2006-7700 | | 1/2006 |
| JP | 2006047964 A | * | 2/2006 |
| JP | 2006-154402 | | 6/2006 |
| JP | 2006-323304 | | 11/2006 |

* cited by examiner

*Primary Examiner*—Hargobind S Sawhney
(74) *Attorney, Agent, or Firm*—Morrison & Foerster LLP

(57) ABSTRACT

A display device that performs display by illuminating an object having a display surface is reduced in size and improved in viewability. A panel-shaped illumination device is disposed facing a display surface of an instrument that is the illumination object. The illumination device has light-emitting regions patterned finely and facing the display surface of the instrument. A light-shielding layer is disposed on the light-emitting region of the illumination device on a side not facing the display surface of the instrument, that is, an observer-side. Illumination light emitted from the light-emitting region illuminates the display surface of the instrument uniformly and is reflected toward the observer before visually recognized through transparent region of the illumination device. At that time, direct visual recognition by the observer of the illumination light emitted from the light-emitting region is suppressed.

15 Claims, 7 Drawing Sheets

DISPLAY DEVICE

CROSS-REFERENCE OF THE INVENTION

This application claims priority from Japanese Patent Application Nos. 2007-023198 and 2007-280614, the contents of which are incorporated herein by reference in their entirety.

BACKGROUND OF THE INVENTION

1. Field of the Invention

This invention relates to a display device, specifically to a display device that performs a display by illuminating an object having a display surface such as a vehicle-mounted instrument.

2. Description of the Related Art

The vehicle-mounted instrument such as a speedometer and a tachometer is structured as an electronic display device, and mounted in an instrument panel in front of a driver's seat. Such a display device will be described hereafter referring to the drawings. FIG. 9A shows a vehicle-mounted display device according to a prior art. FIG. 9B shows a cross-sectional view of a section B-B in FIG. 9A.

A display device 100 that is mounted in an instrument panel 10P is composed of an instrument 110 that is an illumination object having a display surface and a light source 120 such as a light bulb placed on a backside (a side not facing an observer), as shown in FIG. 9A and FIG. 9B. A speedometer display 111, a tachometer display 112 and other displays 113 are placed in the instrument 110. These displays are made of transparent material or a transmission type liquid crystal panel. Each of the displays is visually recognized by that the light from the light source 120 passes through each of the displays and travels toward the observer.

Technologies mentioned above are disclosed in Japanese Patent Application Publication No. 2002-257602.

However, there is a problem that the display device 100 described above takes a large space to be mounted in the instrument panel 10P, because the light source 120 such as the light bulb is placed in the instrument 110 on the side not facing the observer. Also, there is a problem that brightness within the display surface is inhomogeneous to reduce the viewability, because a distance between the light source 120 and the instrument 110 is not uniform. Also, when the display in the instrument 110 is provided with a pointer, there is a problem that the structure of the display device 100 becomes complicated, because an additional illumination device dedicated for the pointer is required.

SUMMARY OF THE INVENTION

This invention is directed to reduce the size and to improve the viewability of the display device. This invention offers a display device including an illumination object having a display surface and a panel-shaped illumination device having a light-emitting region structured finely and disposed to face the display surface of the illumination object and a light-shielding layer disposed on the light-emitting region on a side not facing the display surface of the illumination object.

With a structure described above, the display device can be reduced in size because the panel-shaped illumination device is used as a light source. Also, brightness of the display surface is homogeneous because the distance between the illumination device and the illumination object is uniform. Furthermore, leakage of the light from the light-emitting region to an observer-side is suppressed to improve the viewability, because the light-emitting region of the illumination device is covered with the light-shielding layer on the observer-side.

DETAILED DESCRIPTION OF THE INVENTION

Figure 1A:
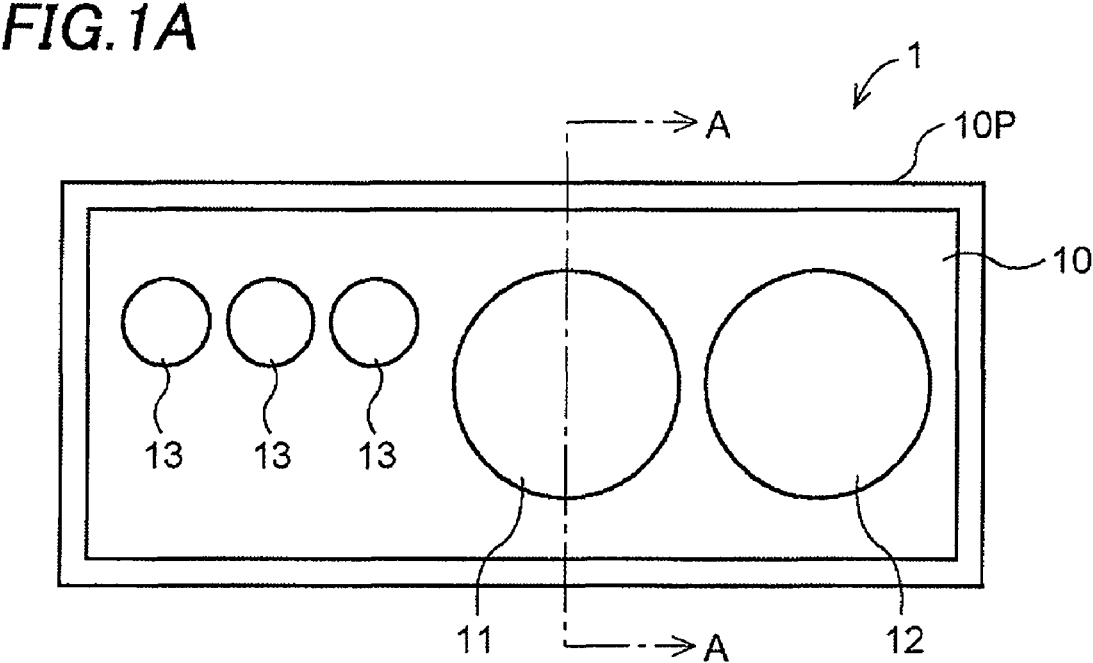
FIGS. 1A and 1B are an outline plan view and an outline cross-sectional view, respectively, showing a display device according a first embodiment of this invention.
Figure 1B:
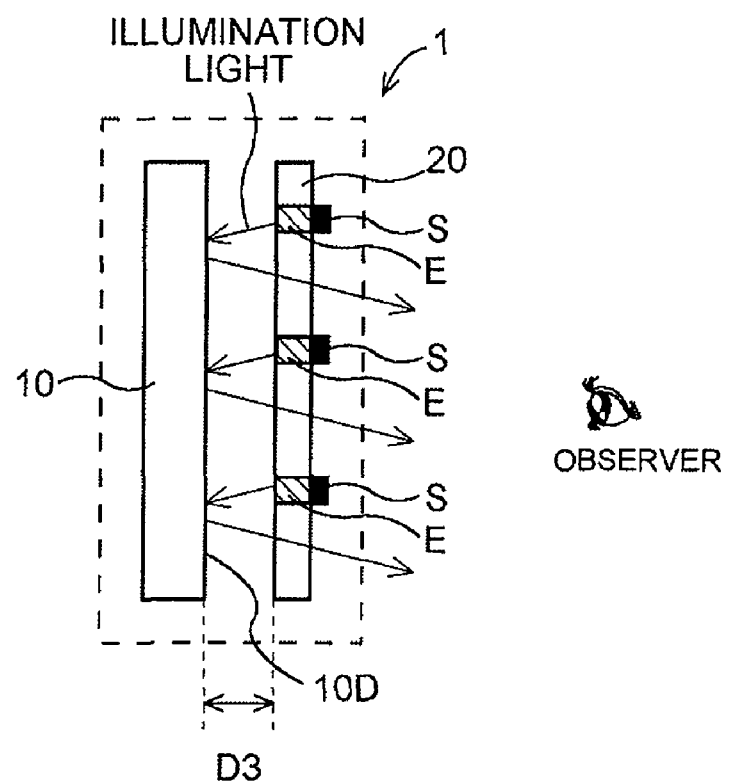

First, an outline structure of a whole display device according to a first embodiment of this invention will be described referring to the drawings. FIG. 1A is an outline plan view showing the display device according to the first embodiment. FIG. 1B is an outline cross-sectional view of a section A-A in FIG. 1A.

As shown in FIGS. 1A and 1B, the display device 1 mounted in an instrument panel 10P is composed of an instrument 10 that is an illumination object having a display surface 10D and a panel-shaped illumination device 20. A speedometer display 11, a tachometer display 12 and other displays 13 such as a fuel gauge display, an odometer display, a warning display, a turn indicator display and a clock display are placed on the display surface 10D of the instrument 10. These displays may be made of either transparent material or opaque material. Or, the displays may be made of a reflection type liquid crystal panel.

The illumination device 20 is placed facing the display surface 10D of the instrument 10. The illumination device 20 has light-emitting regions E that are patterned finely and facing the display surface 10D of the instrument 10. Illumination light emitted from the light-emitting regions E illuminates the display surface 10D of the instrument 10 uniformly. A light-shielding layer S is formed on each of the light-emitting regions E on a side not facing the display surface 10D of the instrument 10, that is, a side opposite to a side facing the display surface 10D. The illumination light emitted from the light-emitting regions E is not visually recognized directly by the observer.

The illumination light illuminating the display surface 10D of the instrument 10 is reflected toward the illumination device 20. The reflected illumination light travels toward the observer through transparent regions (mainly regions where the light-emitting region E and the light-shielding layer S are not formed) of the illumination device 20. That is, the display surface 10D of the instrument 10 is visually recognized by the reflected illumination light.

Figure 2:
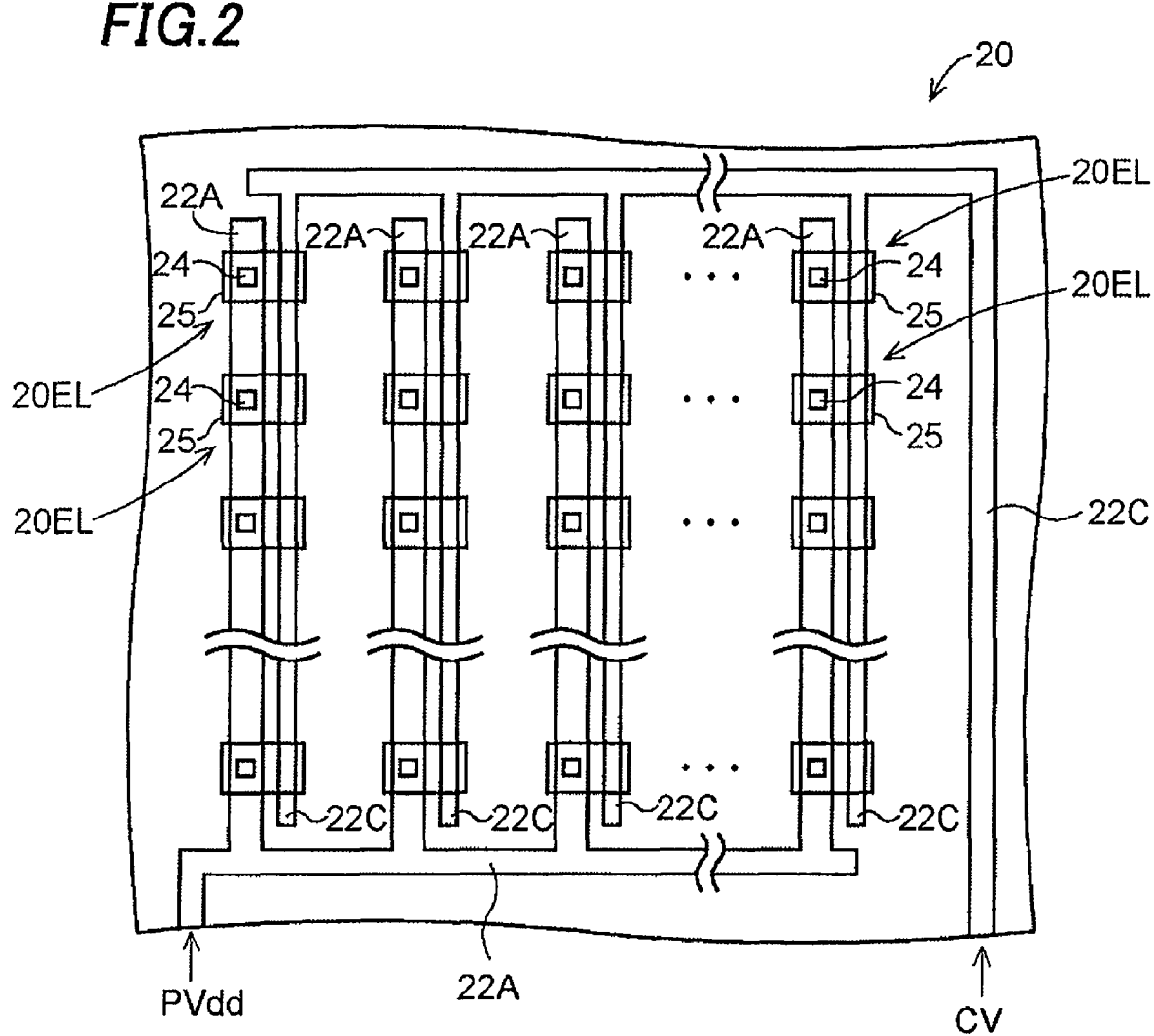
FIG. 2 is a plan view showing an illumination device in the display device according the first embodiment of this invention.
Figure 3:
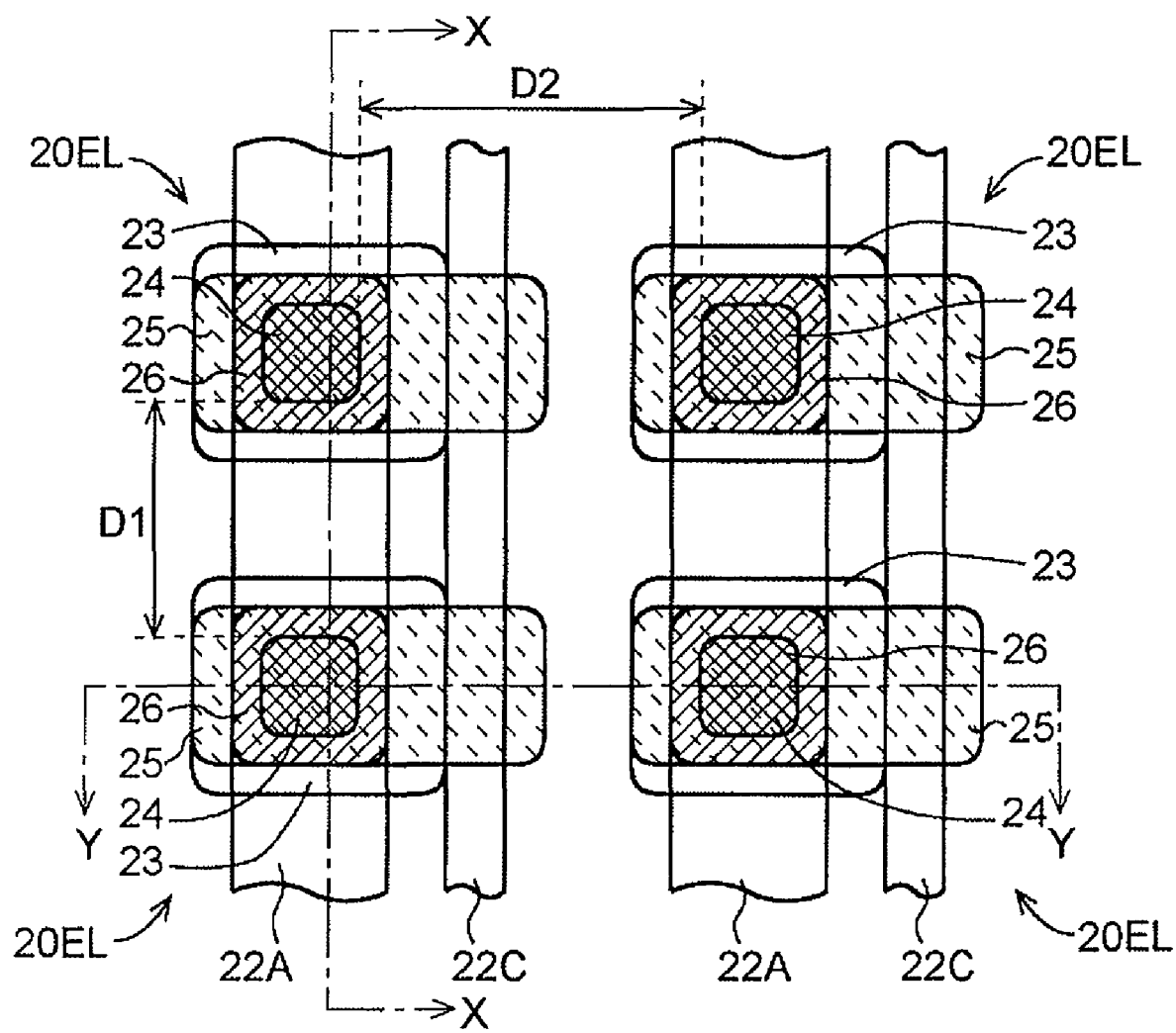
FIG. 3 is a magnified view of a portion of FIG. 2.

The illumination device 20 is an organic EL (Electroluminescent) panel on which a plurality of fine organic electroluminescent devices (hereafter referred to as organic EL devices) is disposed as a light source. A layout of the organic EL devices in a plane of the illumination device 20 will be explained hereafter referring to the drawings. FIG. 2 is a plan view showing the illumination device 20 in the display device 1. FIG. 3 is a magnified view of a portion of FIG. 2, which shows neighboring four organic EL devices only. Only primary components are shown in FIG. 2 and in FIG. 3 for the sake of simplicity of explanation.

As shown in FIG. 2, each of the organic EL devices 20EL in the illumination device 20 is composed of a first transparent electrode (that is, an anode) 22A to which a positive power supply voltage PVdd is supplied, an organic light-emitting layer 24 disposed on it and a metal layer (that is, a cathode) 25 that is connected with a second transparent electrode 22C to which a negative power supply voltage CV is supplied and covers the organic light-emitting layer 24. The first transparent electrode 22A and the second transparent electrode 22C are made of ITO (Indium Tin Oxide), for example. Each of them has a plurality of stripe portions extending in the plane of the illumination device 20. The metal layer 25 is made of metal that reflects light, that is, aluminum, for example.

The light-emitting regions of the organic EL devices 20EL are disposed in the plane of the illumination device 20 separated from each other at regular intervals. Here, the light-emitting region of the organic EL device 20EL corresponds to the light-emitting region E in FIG. 1B and means a region where the first transparent electrode 22A, the organic light-emitting layer 24 and the metal layer 25 overlap with each other. In FIG. 2, a region where the organic light-emitting layer 24 is formed corresponds to the light-emitting region.

When a vertical distance between the light-emitting regions of neighboring organic EL devices 20EL is represented by D1 and a horizontal distance between the light-emitting regions of the neighboring organic EL devices is represented by D2, D1 and D2 are equal to or less than 200 μm, preferably equal to or less than 50 μm. By setting the distances between the neighboring light-emitting regions as described above, it is made possible to illuminate the vehicle-mounted instrument 10 with suitable illumination light to improve the viewability.

Figure 4:
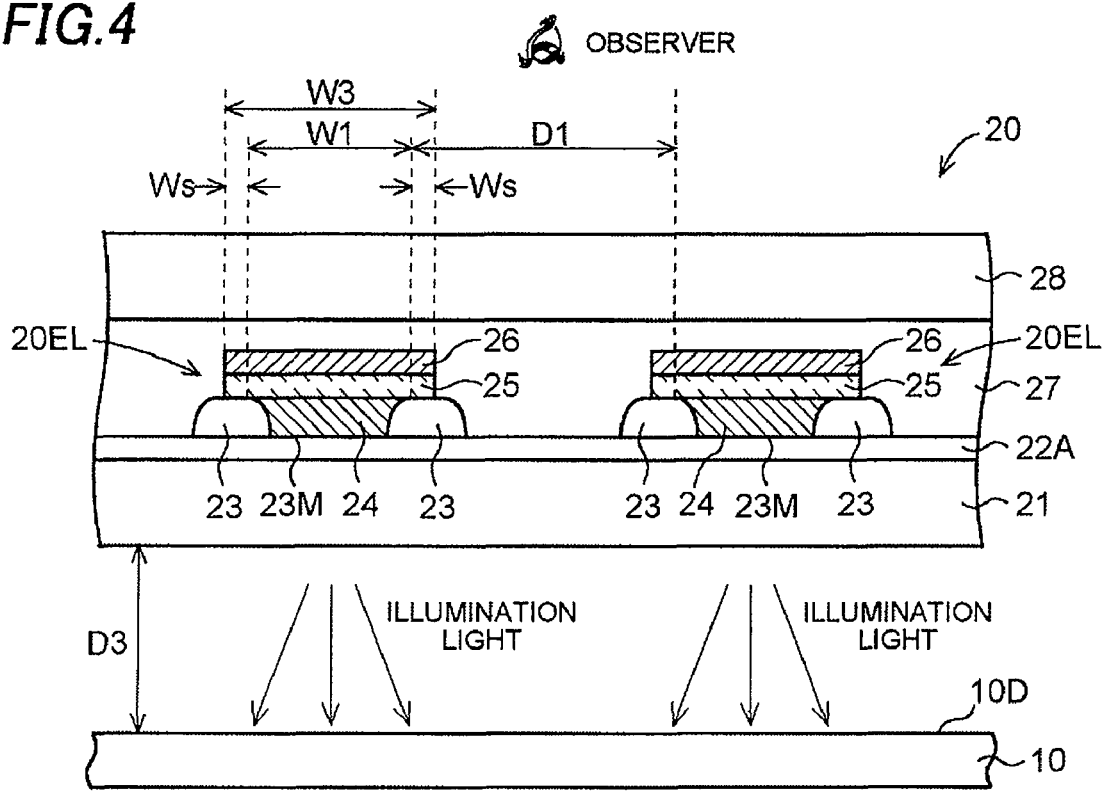
FIG. 4 is a cross-sectional view showing a section X-X in FIG. 3.
Figure 5:
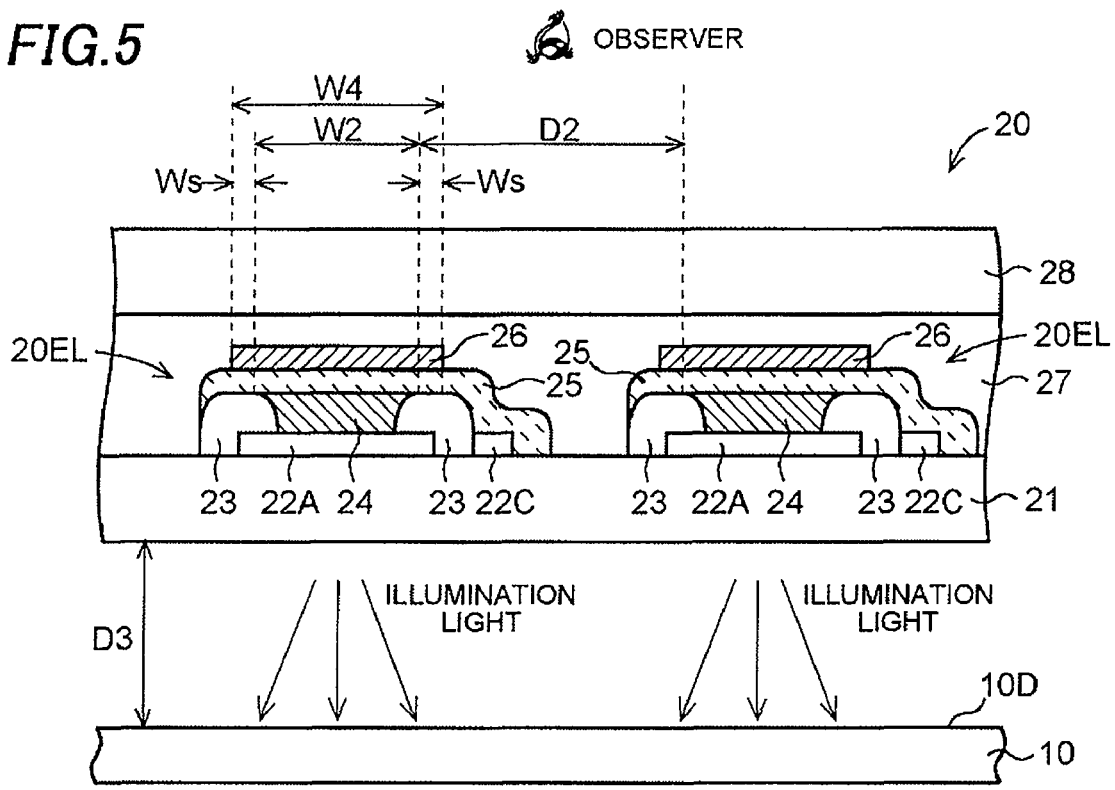
FIG. 5 is a cross-sectional view showing a section Y-Y in FIG. 3.

Detailed structure of the illumination device 20 will be explained referring to its cross-sectional views. FIG. 4 is a cross-sectional view showing a section X-X in FIG. 3, and FIG. 5 is a cross-sectional view showing a section Y-Y in FIG. 3. As shown in FIGS. 3, 4 and 5, the first transparent electrode 22A and the second transparent electrode 22C are disposed on a first transparent substrate 21 made of a glass substrate, for example. An insulation film 23 that is a silicon oxide film, for example, having an opening 23M is formed on the first transparent electrode 22A in a region where each of the organic EL devices 20EL is formed.

The organic light-emitting layer 24 is formed on the first transparent electrode 22A exposed in the opening 23M. The metal layer 25 is formed on the organic light-emitting layer 24. The metal layer 25 is insulated from the first transparent electrode 22A through the insulation film 23.

Because it is made of metal that reflects light, the metal layer 25 reflects the light emitted from the organic light-emitting layer 24 toward the instrument 10 as well as shielding the light so as not to go toward the observer. In addition, a resin layer 26 that has light-shielding ability may be formed on the metal layer 25 to cover the light-emitting region of the organic EL device 20EL in order to shield the light even more securely. That is, the metal layer 25 or a stacked structure of the metal layer 25 and the resin layer 26 functions as the light-shielding layer S (Refer to FIG. 1B.). The resin layer 26 is made of a colored material that shields the light. The resin layer 26 is preferably a black resin layer made of a resin mixed with black pigments dispersed in the resin.

With the structure described above, a light transmission factor of the light-shielding layer S made of the metal layer 25 or the metal layer 25 and the resin layer 26 is equal to or less than 1%. A good contrast for the vehicle-mounted instrument 10, that is a contrast ratio of equal to or greater than 100:1, can be obtained by the transmission factor.

In order to further enhance the light-shielding ability, a vertical width W3 and a horizontal width W4 of the resin layer 26 are set to be wider than a vertical width W1 and a horizontal width W2 of the light-emitting region of the organic EL device 20EL, respectively, by extending the resin layer 26 at each edge by a predetermined width Ws. For example, W1 and W2 are about 5 μm and Ws is about 2 μm. In order to obtain brightness required for visual recognition, the regions where the light-shielding layers S each made of the metal layer 25 and the resin layer 26 are formed occupy an area that satisfies a condition that an aperture ratio in the plane of the illumination device 20 is equal to or larger than 90%.

These organic EL devices 20EL are sealed with a second transparent substrate 28 made of a glass substrate, for example, through a sealing material 27 made of a transparent resin, for example. The illumination device 20 structured as described above is thinner than the light source 120 in the display device 100 according to the prior art, and is about 1 mm thick, for example. And in the structure described above, a distance D3 between the display surface 10D of the instrument 10 and a light-emitting surface of the illumination device 20 facing to it, that is, a surface of the first transparent substrate 21, is equal to or less than 10 mm, a distance with which good viewability is obtained for the vehicle-mounted instrument 10.

Since the illumination device 20 has a shape of a thin panel in the display device 1 structured as described above, a space required to mount the illumination device 20 in the instrument panel 10P can be reduced compared with the prior art. In addition, the distance between the light-emitting surface of the illumination device 20 and the display surface 10D of the instrument 10 is made uniform and the brightness in the display surface 10D of the instrument 10 that is visually recognized becomes homogeneous to improve the viewability. Since the illumination light from the illumination device 20 is prevented from leaking toward the observer because of the light-shielding ability of the metal layer 25 and the resin layer 26, the viewability of the displays in the instrument 10 can be further enhanced.

Figure 6:
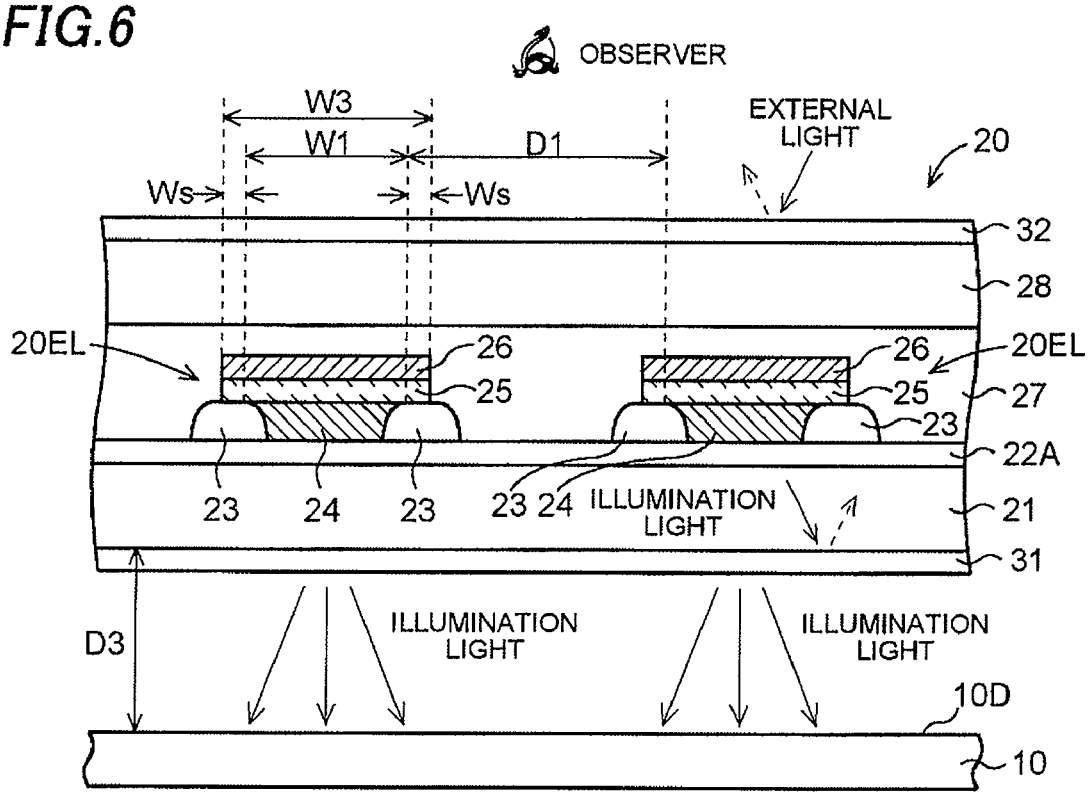
FIG. 6 is a cross-sectional view showing a display device according a second embodiment of this invention.

A second embodiment of this invention will be explained hereafter referring to the drawings. FIG. 6 is a cross-sectional view showing a display device according to the second embodiment of this invention. The same symbols are used for the common components as in the first embodiment and explanations on them are omitted.

In the second embodiment, so-called AR coating (Anti-Reflective coating) is applied to a surface of the illumination device 20 in the first embodiment. That is, a first antireflective layer 31 made of stacked layers of transparent materials that are different in refractive index from each other is formed on the surface of the first transparent substrate 21 facing the instrument 10, as shown in FIG. 6.

In the first embodiment, because a refractive index of the first transparent substrate 21 is different from a refractive index of a space existing between the instrument 10 and the first transparent substrate 21, the light traveling from the organic EL devices 20EL to the instrument 10 is reflected toward the observer at an interface between the space and the first transparent substrate 21. The reflected light reduces the viewability. In the second embodiment, on the other hand, the reflection of the light traveling from the organic EL devices 20EL to the instrument 10 toward the observer can be suppressed at the interface between the first transparent substrate 21 and the first antireflection layer 31.

Also, in the first embodiment, there is a case in which external incident light from the observer to the instrument 10 is reflected toward the observer at a surface of the second transparent substrate 28 facing the observer to reduce the viewability. In order to suppress the reflected light, a second antireflection layer 32 that is similar to the first antireflection layer 31 is also formed on the surface of the second transparent substrate 28 facing the observer when necessary.

Figure 7:
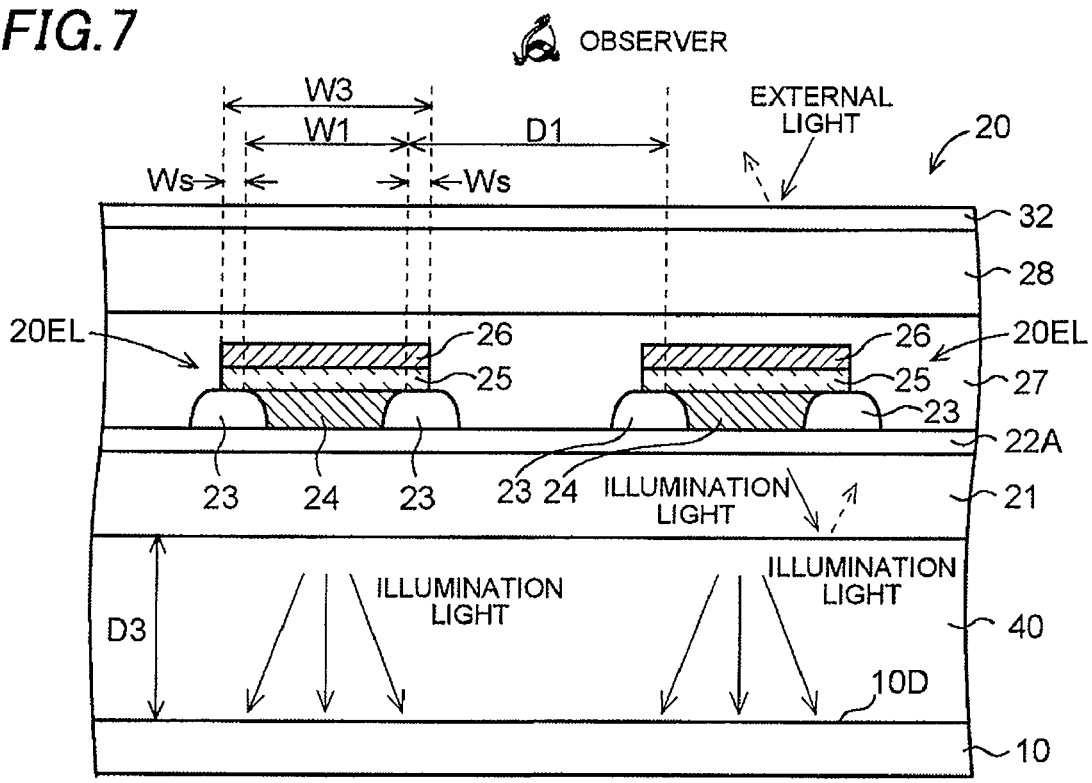
FIG. 7 is a cross-sectional view showing a display device according a third embodiment of this invention.

A third embodiment of this invention will be explained hereafter referring to the drawings. FIG. 7 is a cross-sectional view showing a display device according to the third embodiment of this invention. The same symbols are used for the common components as in the second embodiment and explanations on them are omitted.

In the third embodiment, instead of the first antireflection layer 31, a transparent material 40 having the same refraction index as the first transparent substrate 21 is formed to fill the space existing between the instrument 10 and the first transparent substrate 21 in the second embodiment, as shown in FIG. 7. In this case, the reflection of the light traveling from the organic EL devices 20EL to the instrument 10 toward the observer can be suppressed at an interface between the first transparent substrate 21 and the transparent material 40.

The transparent material 40 may be a solid material when there is no moving part such as a pointer in the display of the instrument 10. When there is a moving part such as a pointer, a fluid material of viscosity of 10-1000 cp may be used. The solid material is UV cure acryl resin, for example. The fluid material is non-volatile oil, for example.

Figure 8:
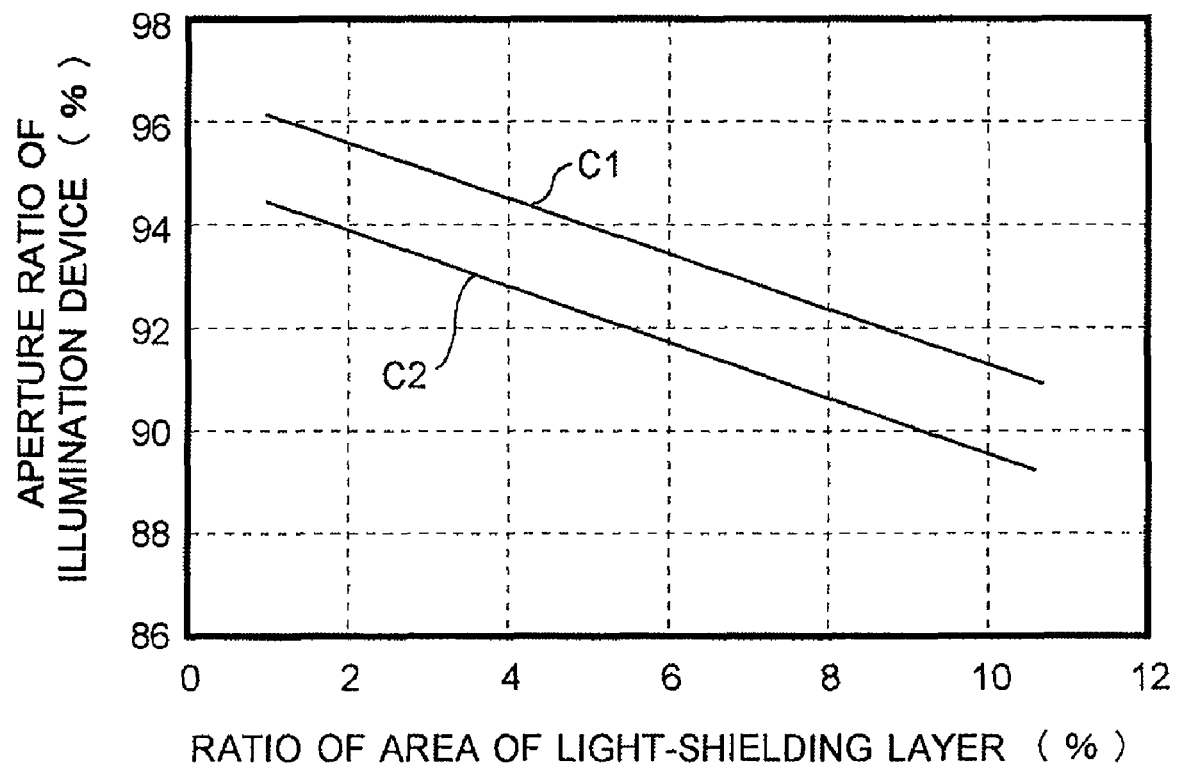
FIG. 8 shows a correlation between an aperture ratio in a plane of the display device and an area of a light-shielding layer.
Figure 9A:
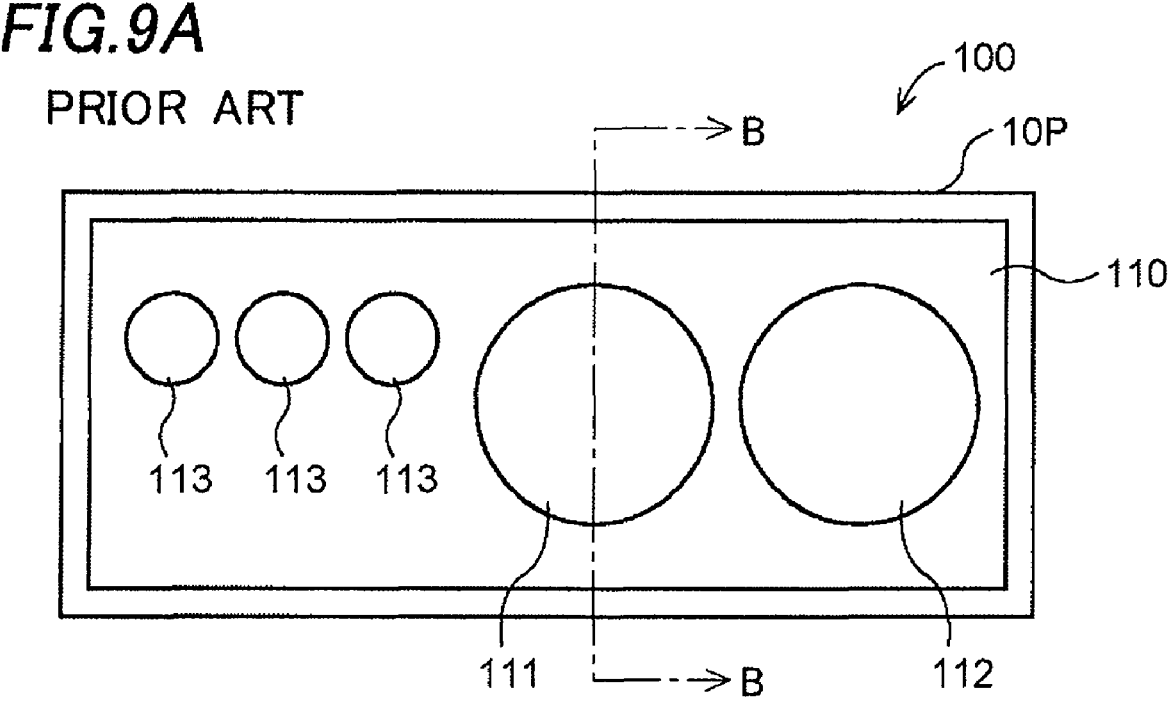
FIGS. 9A and 9B are a plan view and a cross-sectional view, respectively, showing a display device according to a prior art.
Figure 9B:
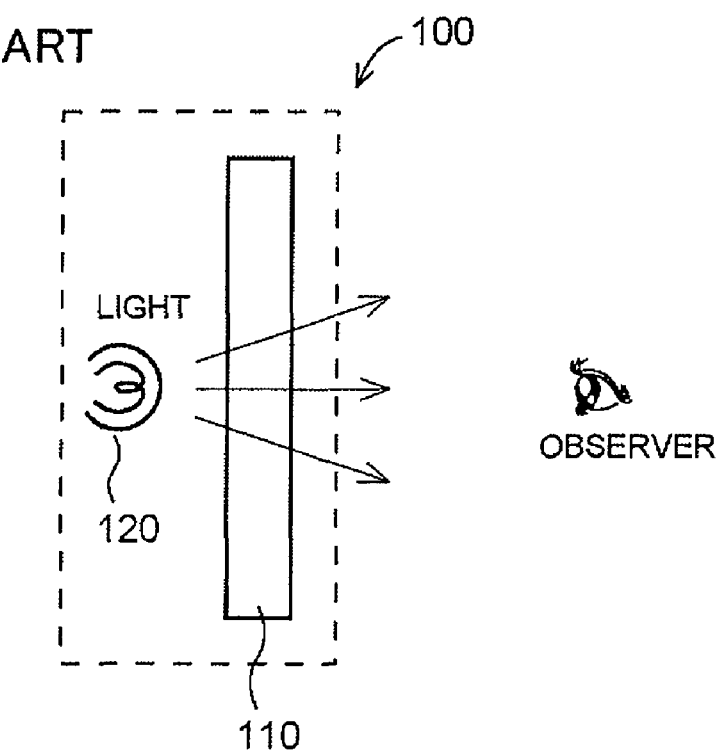

In the first through third embodiments described above, it is preferable that a ratio of an area of the light-shielding layers S (made of the metal layers 25 and the resin layers 26) to an area of the plane of the illumination device 20 (that is, a plane parallel to the instrument 10) is equal to or less than 3%. It is more preferable that the first antireflection layer 31 is formed on the surface of the first transparent substrate 21 facing the instrument 10. With the structure described above, the aperture ratio (that is, a light transmission factor) in the plane of the illumination device 20 can be made equal to or greater than 90% as understood from a graph in FIG. 8 showing correlation between the aperture ratio in the plane of the illumination device 20 and the area of the light-shielding layers S. The graph is obtained from experiments conducted by the inventor. Its vertical axis corresponds to the aperture ratio (%) in the plane of the illumination device 20, and its horizontal axis corresponds to the ratio of the area of the light-shielding layers S to the area of the plane of the illumination device 20. C1 in the graph shows a case where the first antireflection layer 31 is formed, while C2 shows a case where the first antireflection layer 31 is not formed.

Since the aperture ratio in the plane of the illumination device 20 is increased as described above, not only the brightness of the illumination light is increased when the incident light from the illumination device 20 to the instrument 10 that is the illumination object is reflected toward the observer, but also enough brightness is secured as the external incident light illuminating the instrument 10 through the illumination device 20 is effectively reflected to reach the observer even when the illumination device 20 is turned off and no illumination light is emitted.

When the illumination device 20 emits the illumination light, it is preferable for the observer to obtain enough brightness that the brightness of the organic EL devices 20EL of the illumination device 20 is equal to or greater than 10 cd/m$^2$. It does not matter because power consumption of the organic EL devices 20EL required to realize the brightness can be supplied sufficiently from a vehicle-mounted power supply.

Although the illumination object is the vehicle-mounted instrument 10 in the first through third embodiments, this invention is not limited to the above and may be applied to other illumination objects. For example, the illumination object may be a display in a measuring instrument for an electronic circuit, a display of a clock, a simple dial or a paper.

When the illumination object is the display of a clock, for example, the clock is placed so that the display of the clock faces the first transparent substrate 21. Here, it is preferable that a ratio of an area of the light-shielding layers S to an area of a plane of the illumination device 20 (that is, a plane parallel to the display) is equal to or less than 3% and that an aperture ratio in the plane of the illumination device 20 is equal to or greater than 90%. It is more preferable that the first antireflection layer 31 is formed on the surface of the first transparent substrate 21 facing the clock. Since the aperture ratio in the plane of the illumination device 20 is increased with the structure described above, enough brightness is secured as external incident light illuminating the display of the clock through the illumination device 20 is effectively reflected to reach the observer, even when the illumination device 20 is turned off and no illumination light is emitted.

When the illumination device 20 emits the illumination light, it is preferable for the observer to obtain enough brightness that the brightness of the organic EL devices 20EL is equal to or greater than 5 cd/m$^2$. Preferable specifications of the illumination device 20 are an applied voltage of about 6 V, an electric current of about 1 mA and a power consumption of about 6 mW. As a result, low power consumption display is made possible even with the clock which is restricted to low power consumption because it is powered by an isolated power supply.

Although the organic EL devices 20EL are disposed in the plane of the illumination device 20 separated from each other at regular intervals in the first through third embodiments, they may be disposed differently such as in a grating pattern, as long as the effects equivalent to the above are obtained.

Although the organic EL device 20EL is disposed in the illumination device 20 as the light source in the first through third embodiments, other light source such as an inorganic EL device may be used as long as it gives the effects equivalent to those described above.

According to the embodiments of this invention, the display device that performs the display by illuminating the object having the display surface can be reduced in size and improved in viewability.

What is claimed is:

1. A display device comprising:
    an illumination object comprising a display surface; and
    a panel-shaped illumination device comprising light-emitting regions disposed so as to face the display surface of the illumination object and a light-shielding layer disposed on each of the light-emitting regions on a side not facing the display surface of the illumination object,
    wherein the light-emitting regions are isolated from each other so as to form a predetermined pattern within a plane of the panel-shaped illumination device, each of the light-emitting regions comprises a stack of a metal layer, an organic light-emitting layer and a first transparent electrode, the light-shielding layer comprises the metal layer, and a second transparent electrode connects the metal layers of the isolated light-emitting regions.

2. The display device of claim 1, wherein a distance between neighboring pair of the light-emitting regions is equal to or less than 200 μm.

3. The display device of claim 1, wherein a transmission factor of the light-shielding layer is equal to or less than 1%.

4. The display device of claim 1, wherein the light-shielding layer comprises a resin layer that is disposed further away from the illumination object than the metal layer.

5. The display device of claim 4, wherein the resin layer comprises black pigments dispersed therein.

6. The display device of claim 4, wherein the resin layer is larger than the metal layer in the plane of the panel-shaped illumination device.

7. The display device of claim 1, further comprising a transparent antireflection layer disposed on the illumination device on a side facing the illumination object or on a side not facing the illumination object.

8. The display device of claim 1, wherein the illumination object comprises a display of an instrument.

9. The display device of claim 8, wherein a distance between a display surface of the display of the instrument and a light-emitting surface of the illumination device is equal to or less than 10 mm.

10. The display device of claim 9, wherein the display of the instrument is disposed in an instrument panel of an automobile.

11. The display device of claim 1, wherein a ratio of an area of the light-shielding layers to an area of the plane of the illumination device is equal to or less than 3%.

12. The display device of claim 1, wherein the light-shielding layer is larger than the light-emitting region.

13. The display device of claim 1, wherein an insulation film having an opening is formed on the first transparent electrode, the organic light-emitting layer is formed on the first transparent electrode exposed in the opening, and the light-shielding layer is larger than the organic light-emitting layer.

14. The display device of claim 1, wherein a thickness of the illumination device is about 1 mm, and a transparent material fills at least partially a gap between the illumination device and the illumination object.

15. The display device of claim 14, wherein the display surface comprises a movable pointer, and the transparent material is a fluid having a viscosity of 10-1000 cp.

* * * * *